(12) United States Patent
Day

(10) Patent No.: US 7,793,961 B2
(45) Date of Patent: Sep. 14, 2010

(54) FOOTREST SUPPORT DEVICE FOR A MOTORCYCLE PASSENGER

(76) Inventor: Daniel G. Day, 5649 Biscayne Ave., Cincinnati, OH (US) 45248

( * ) Notice: Subject to any disclaimer, the term of this patent is extended or adjusted under 35 U.S.C. 154(b) by 210 days.

(21) Appl. No.: 11/735,024

(22) Filed: Apr. 13, 2007

(65) Prior Publication Data

US 2008/0252035 A1    Oct. 16, 2008

(51) Int. Cl.
*B62J 25/00* (2006.01)
*G05G 1/60* (2008.04)

(52) U.S. Cl. .................... 280/291; 280/220; 296/75; 74/564

(58) Field of Classification Search .............. 296/75, 296/423.18; 280/291, 220, 288.4; D12/114; 74/564; 297/423.18; 180/90.6
See application file for complete search history.

(56) References Cited

U.S. PATENT DOCUMENTS

| 516,902 | A | * | 3/1894 | Smith ................... 280/291 |
| 555,576 | A | * | 3/1896 | Logan .................... 296/75 |
| 578,335 | A | * | 3/1897 | Hughes .................. 280/291 |
| 1,261,442 | A | | 4/1918 | Rigby |
| 3,773,355 | A | * | 11/1973 | Swartz .................... 280/291 |
| 4,451,057 | A | | 5/1984 | Lawson |
| 4,546,993 | A | | 10/1985 | Walker |
| 5,090,715 | A | | 2/1992 | Nakajima et al. |
| 5,779,254 | A | | 7/1998 | James et al. |
| 6,152,474 | A | * | 11/2000 | Rupert ................... 280/291 |
| 6,173,983 | B1 | * | 1/2001 | Moore .................... 280/291 |
| 6,719,316 | B1 | | 4/2004 | Anthony |
| 7,114,739 | B2 | | 10/2006 | Colano |
| 7,637,523 | B2 | * | 12/2009 | Fouhy ..................... 280/291 |
| 2008/0111345 | A1 | * | 5/2008 | Springer ................. 280/291 |

* cited by examiner

*Primary Examiner*—Lesley Morris
*Assistant Examiner*—Wesley Potter
(74) *Attorney, Agent, or Firm*—Wood, Herron & Evans, L.L.P.

(57) ABSTRACT

A removable foot support device for a motorcycle passenger generally comprises an elongate member having a first end portion and a second end portion. The first end portion is removably mounted to a first portion of a motorcycle. A support member coupled to the second end portion of the elongate member includes a footrest surface for supporting the passenger's foot.

15 Claims, 3 Drawing Sheets

FOOTREST SUPPORT DEVICE FOR A MOTORCYCLE PASSENGER

FIELD OF THE INVENTION

The present invention relates generally to motorcycles and, more particularly, to a device for supporting a foot of a motorcycle passenger and motorcycles incorporating such a device.

BACKGROUND

Conventional motorcycles typically include a seat for supporting an operator. A large number of motorcycles also include a seat for supporting a passenger behind the operator. The passenger straddles the seat so that his or her legs are positioned on opposite sides of the motorcycle. For the purposes of safety and comfort, passenger footrest assemblies extend from the body of the motorcycle on each side. The passenger footrest assemblies may each include, for example, a rod attached to and extending outwardly from the body of the motorcycle and a foot support attached to the rod. Alternatively, the passenger footrest assemblies may each comprise a foot peg. It is also possible for the passenger to have available both a foot support and a foot peg.

The size and body shape of passengers riding on a motorcycle may vary greatly from one passenger to another. Typically, the passenger footrest assembles are positioned relative to the passenger seat in a manner designed to accommodate the average adult person within the confines of the overall motorcycle design. The footrest assemblies are thus positioned in a manner so that the foot of an average adult person can be comfortably supported when that person is seated on the passenger seat. Although some footrest assemblies may include components that can fold upwardly and inwardly toward the motorcycle when not in use, the assemblies are typically permanently attached to the motorcycle such that their position relative to the passenger seat cannot be adjusted. As a result, standard footrest assemblies may not be suited to accommodate passengers whose height and body build differ from the average adult person. These passengers, particularly those of a shorter than average height, may find it difficult to comfortably and safely reach the passenger footrest.

Several attempts have been made to develop a suitable footrest or foot support for passengers whose feet cannot normally reach the standard passenger footrest assemblies. These attempts, however, focus on rigidly attaching a support to the motorcycle with bolts or the like. Because not all passengers require the special support, an operator who does not wish to leave the support on the motorcycle must expend a considerable amount of time and effort to detach and reattach the support. Additionally, attaching and detaching the support typically requires additional tools. If an operator would like to have the ability to detach the support at any time, he or she must transport these additional tools. Once detached, the operator then faces the problem of what to do with the support. Many of the supports are rather bulky and heavy, and are not designed to be easily transported unless rigidly attached to their intended position on the motorcycle.

SUMMARY OF THE INVENTION

The invention provides a foot support device for a motorcycle passenger. The foot support device can be easily and quickly attached onto and removed from a motorcycle, and can be easily transported by the operator of the motorcycle. To this end, the foot support device generally comprises an elongate member having a first end portion and a second end portion. The first end portion is removably mounted to a first portion of the motorcycle. A support member coupled to the second end portion of the elongate member includes a footrest surface for supporting the passenger's foot.

A motorcycle incorporating such a device is also provided. The motorcycle includes a chassis, a passenger seat supported by the chassis, and a passenger footrest assembly spaced a first distance from the passenger seat. The elongate member of the foot support device is removably mounted to a component member of the passenger footrest assembly and positioned so that the footrest surface of the support member is positioned a second distance from the passenger seat. The second distance is less than the first distance to accommodate passengers who have a foot that must be specially supported.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
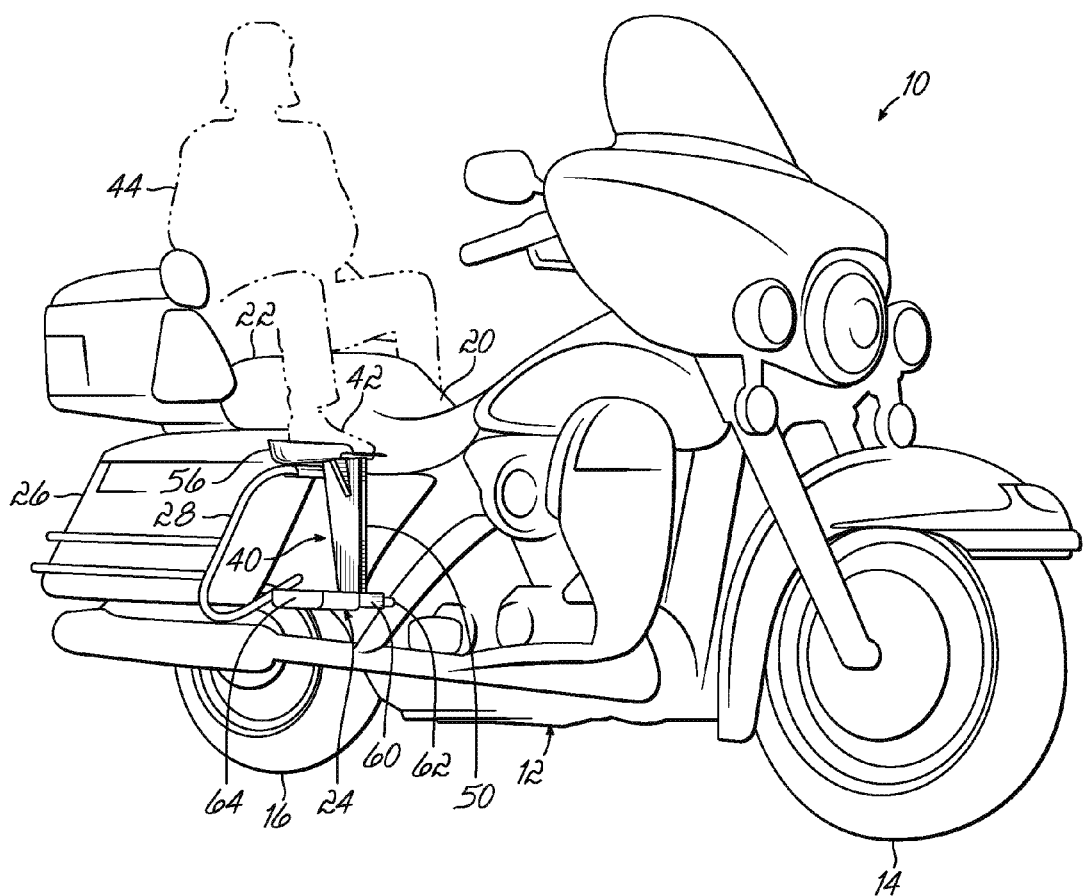
FIG. 1 is a perspective view showing a motorcycle and a device for supporting the foot of a passenger according to one embodiment of the invention.

With reference to FIG. 1, a motorcycle 10 according to one embodiment of the invention is shown. Motorcycle 10 generally comprises a chassis 12 supported by a front wheel 14 and a rear wheel 16. Chassis 12, in turn, supports various additional components of motorcycle 10. Such components may include, for example, an operator seat 20, a passenger seat 22, a passenger footrest assembly 24, and optionally a saddle bag storage unit 26. A saddle bar 28 (sometimes referred to as a crash bar) may be provided adjacent saddle bag storage unit 26, as known in the art.

Motorcycle 10 further includes a foot support device 40 for supporting a foot 42 of a passenger 44 on motorcycle 10. Foot support device 40 comprises an elongate member 50 having a first end portion 52 and second end portion 54 and a support member 56 coupled to second end portion 54. First end portion 52 is removably mounted to a first portion of motorcycle 10, such as passenger footrest assembly 24. As used herein, the term "removably mounted" refers to being coupled to another component without the use of fasteners or the like so as to be easily removable, yet sufficiently secured to provide the desired support.

Figure 2:
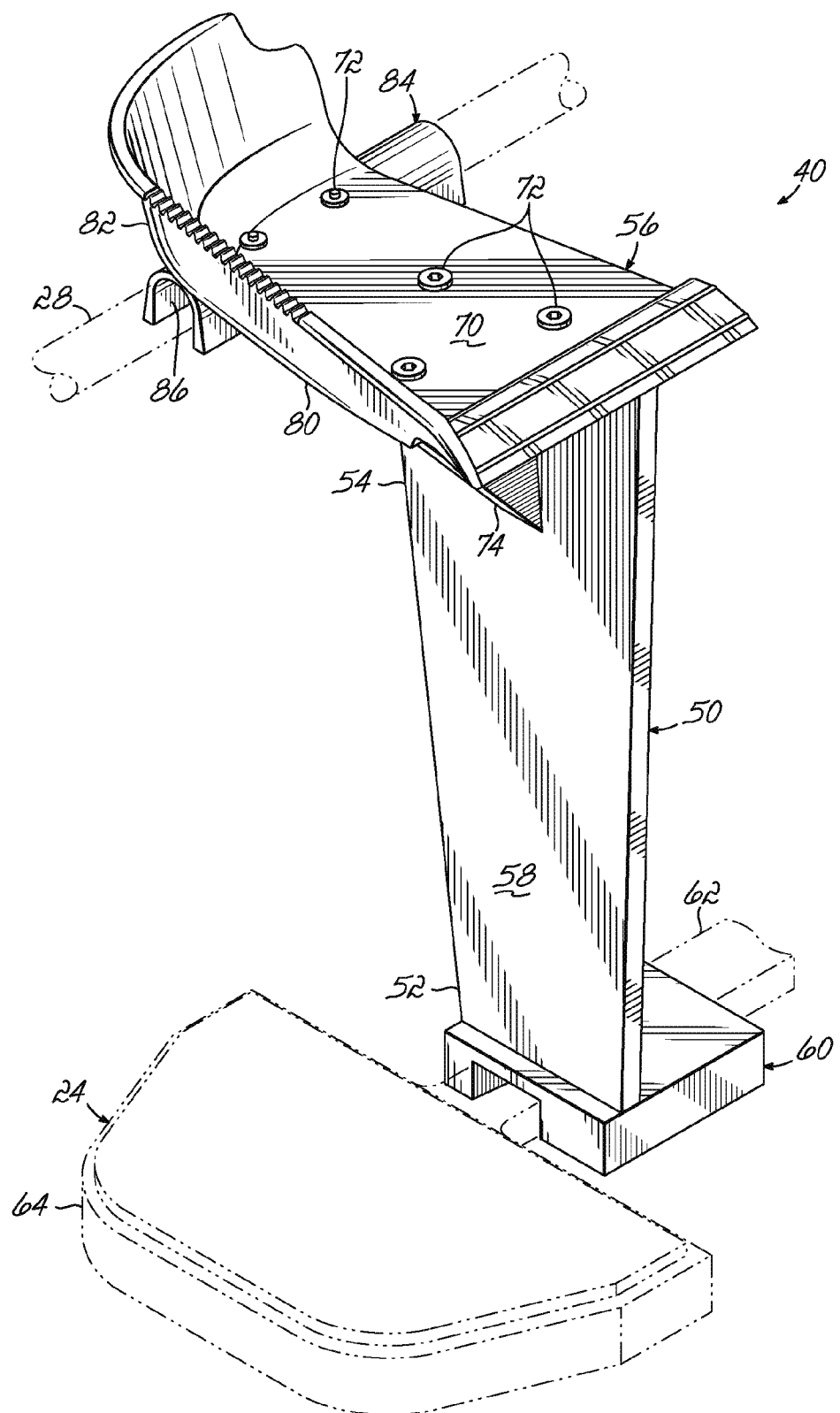
FIG. 2 is a perspective view of the device shown in FIG. 1.
Figure 3:
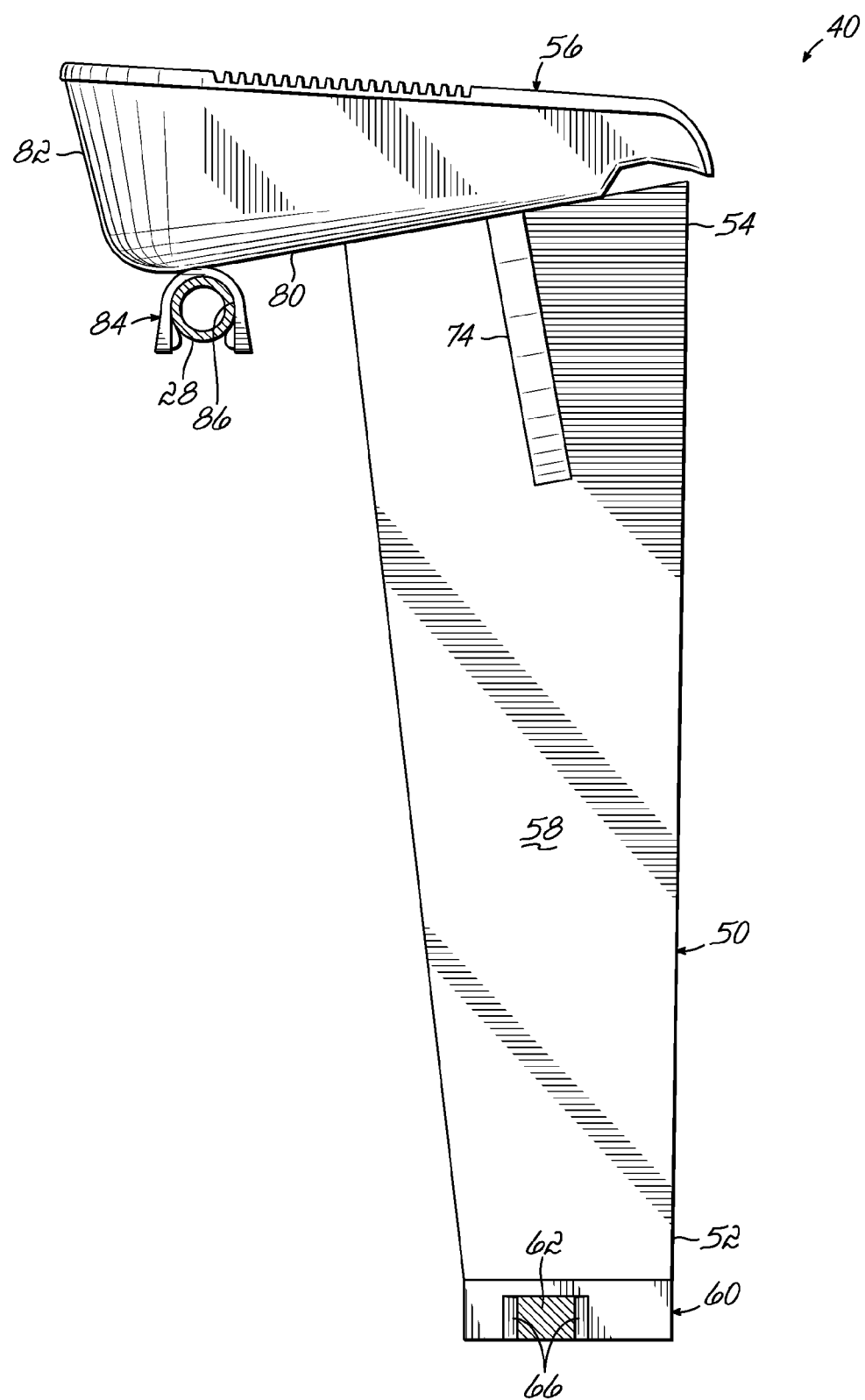
FIG. 3 is a side elevational view of the device shown in FIG. 1.

FIGS. 2 and 3 illustrate the foot support device 40 in further detail. In one embodiment, first end portion 52 of elongate member 50 defines a mounting member 60 received on a first component member 62 (or alternatively second component member 64) of passenger footrest assembly 24. First component member 62 may be an extension or bar extending away from motorcycle 10 to a second component member 64, which may be a foot pad normally supporting the foot of a passenger. Mounting member 60 includes a channel or groove 66 that may be clamped or otherwise removably mounted on first component member 62 (or second component member 64). For example, there may be a slight interference fit between groove 66 and first component member 62 or groove 66 may simply be loosely received on first component member 62. Alternatively, mounting member 60 may include a mating component designed to clamp or otherwise removably mount to a distinct mating location on first component member 62 or second component member 64.

Mounting member 60 is generally a rectangular block incorporating groove 66, although the shape is not so limited. Indeed, mounting member 60 may be any shape designed to interact with a portion of motorcycle 10 to removably mount foot support device 40. Likewise, although elongate member 50 is shown as including a plate-like body 58 that tapers from second end portion 54 to first end portion 52, a wide variety of other shapes and configurations are possible to provide the desired support.

Referring to FIG. 2, support member 56 defines a footrest surface 70 and is coupled to elongate member 50 by one or more fasteners 72 extending through footrest surface 70. Each fastener 72 may be any type of screw, bolt, nail, or the like suitable for attaching support member 56 to elongate member 50. Additionally, it will be appreciated that support member 56 may be integrally molded, adhesively bonded, or melt-bonded with elongate member 50 such that fasteners 72 are not required to couple the two components together. A brace 74 may be provided on elongate member 50 to facilitate supporting support member 56. To this end, one or more fasteners 72 may extend through footrest surface 70 to brace 74 as well.

Footrest surface 70 is generally planar and includes an outer peripheral edge 80. A rim 82 extends upwardly from at least a portion of outer peripheral edge 80. Rim 82 may be a separate component mounted to footrest surface 70 or may be formed integrally therewith. For example, rim 82 may be an extension of footrest surface 70 that has been curved upwardly to help prevent a passenger's foot from sliding off footrest surface 70 when supported thereby.

In addition to being removably mounted to passenger footrest assembly 24, foot support device 40 may also be removably mounted to a second portion of motorcycle 10. For example, FIGS. 1-3 illustrate support member 56 being removably mounted to saddle bar 28 by a mounting element 84. Mounting element 84 includes an arcuate surface 86 generally shaped to conform to saddle bar 28. Like elongate member 50 and brace 74, mounting element 84 may be coupled to support member 56 by fasteners 72 extending through footrest surface 70, or be otherwise bonded or integrally molded with support member 56.

Foot support device 40 is a removable component that can be easily mounted to motorcycle 10 to accommodate passengers who have at least one foot that must be specially supported. Thus, in use, a user simply positions foot support device 40 until groove 66 of mounting member 60 is received over first component member 62 of passenger footrest assembly 24. Although FIG. 2 only illustrates mounting member 60 being removably mounted to first component member 62, elongate member 50 may be designed to removably mount to other portions of motorcycle 10 as well. As discussed above, first end portion 52 of elongate member 50 may be removably mounted to second component member 64 of passenger footrest assembly 24, or to a portion of chassis 12.

Mounting element 84 is aligned with saddle bar 28 when mounting member 60 is being positioned relative to first component member 62. As a result, arcuate surface 86 clamps onto saddle bar 28 when mounting member 60 is positioned to stabilize foot support device 40 relative to motorcycle 10. Like groove 66, mounting element 84 may be designed to provide a slight interference with saddle bar 28. Additionally, although mounting element 84 is shown as being coupled to support member 56, mounting element 84 may alternatively be coupled to elongate member 50. The shape and configuration of mounting element 84 will depend upon its location on foot support device 40 and the shape of the portion of motorcycle 10 to which it is intended to be removably mounted.

Once installed on the motorcycle 10, foot support device 40 provides an area to support foot 42 (FIG. 1) of passenger 44. More specifically, passenger 44, whose legs may not be long enough for his or her foot 44 to reach passenger footrest assembly 24, is able to place his or her foot 44 on footrest surface 70 of support member 56. In this regard, passenger footrest assembly 24 is positioned a first distance away from passenger seat 22 and footrest surface 70 is positioned a second distance away from passenger seat 22, with the second distance being less than the first distance. With foot 42 properly supported, passenger 44 can safely and comfortably ride on motorcycle 10.

To remove foot support device 40, a user simply pulls mounting member 60 off first component member 62 and mounting element 84 off saddle bar 28. Thus, foot support device 40 can be quickly and easily removed without the use of additional tools. Foot support device 40 can also be easily transported. This represents a significant improvement over prior art supports rigidly attached to motorcycles. For example, a motorcycle owner may keep foot support device 40 on hand by storing it in saddle bag storage unit 26 or elsewhere on motorcycle 10. That way the owner can transport passengers whose feet are normally unable to reach a passenger footrest assembly 24.

When passenger 44 or any other passenger whose feet cannot reach a passenger footrest assembly 24 is going to ride on motorcycle 10, the owner or operator simply pulls out foot support device 40 and installs it in the manner described above. Thus, no modifications to motorcycle 10 are required to accommodate passengers of different heights or body shapes. Nevertheless, if desired, foot support device 40 may be fixedly secured to motorcycle 10 after it is removably mounted thereto.

The foot support device 40 may be manufactured from a variety of materials, particularly those which contribute to the desired attributes of low weight, structural rigidity, and resistance to degradation in use. Representative materials having these attributes include, but are not limited to, aluminum, nylon, fiberglass, engineering plastics, and combinations of the above, as well as other polymeric and metallic materials.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, it will be appreciated that the precise positioning of a foot support device 40 onto motorcycle 10, and the dimensions and design of a particular foot support device 40, will vary by individual motorcycle manufacturer and by the design and specifications of individual models offered by individual motorcycle manufacturers. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A device for supporting a foot of a passenger on a motorcycle, the device comprising:

a vertical elongate member having a first end portion and a second end portion, the first end portion configured to be coupled at an underside of the first end portion to a first portion of the motorcycle; and a support member coupled to the second end portion of the elongate member, the support member including a footrest surface configured to provide foot support;

wherein the device is configured to be removably mounted to a second portion of the motorcycle at an underside of the support member.

2. The device of claim 1, wherein the support member is integral with the elongate member.

3. The motorcycle device of claim 1, wherein the footrest surface is generally planar and includes a peripheral edge, the support member further including a rim extending upwardly along at least a portion of the peripheral edge.

4. The device of claim 1, wherein the first end portion of the elongate member defines a mounting element configured to be received on the first portion of the motorcycle to removably mount the elongate member thereto.

5. The device of claim 4, wherein the mounting element includes an open channel of generally rectangular cross-section configured to be received on the component member of the footrest assembly.

6. The device of claim 1, further comprising a mounting element at the underside of the support member, the mounting element having a generally U-shaped cross-sectional profile configured to be received on the second portion of the chassis to removably mount the support member thereto.

7. A motorcycle designed to accommodate passengers who have at least one foot that must be specially supported, the motorcycle comprising:

a chassis;

a passenger seat supported by the chassis;

a passenger footrest assembly supported by the chassis and spaced a first distance from the passenger seat, the passenger footrest assembly including at least one component member; and a foot support device, comprising:
  an elongate member having a first end portion and a second end portion, the first end portion being coupled at an underside of the first end portion to the component member of the passenger footrest assembly; and a support member coupled to the second end portion of the elongate member, the support member including a footrest surface configured to provide foot support for the passenger at a second distance from the passenger seat, the second distance being less than the first distance, wherein the foot support device is removably mounted at an underside of the support member to a second portion of the chassis.

8. The motorcycle of claim 7, wherein the support member is integral with the elongate member.

9. The motorcycle of claim 7, wherein the footrest surface is generally planar and includes a peripheral edge, the support member further including a rim extending upwardly along at least a portion of the peripheral edge.

10. The motorcycle of claim 7, wherein the first end portion of the elongate member defines a mounting element configured to be received on the component member of the passenger footrest assembly to removably mount the elongate member thereto.

11. The motorcycle of claim 10, wherein the mounting element includes an open channel of generally rectangular cross-section configured to be received on the component member of the footrest assembly.

12. The motorcycle of claim 7, further comprising a mounting element at the underside of the support member, the mounting element having a generally U-shaped cross-sectional profile configured to be received on the second portion of the chassis to removably mount the support member thereto.

13. The motorcycle of claim 7, further comprising:
  a first open channel at the first end portion of the elongate member for mounting the foot support device onto the component member;
  a second open channel at the second end portion of the elongate member for mounting the foot support device onto the second portion of the chassis.

14. The motorcycle of claim 7, wherein the coupling between the support member and the second end portion of the elongate member is free of fasteners.

15. The motorcycle of claim 7, wherein said foot support device is manufactured from a material selected from the group consisting of aluminum, nylon, fiberglass, engineering plastics, and polymeric materials.

* * * * *